_United States Patent Office_ 3,476,870
Patented Nov. 4, 1969

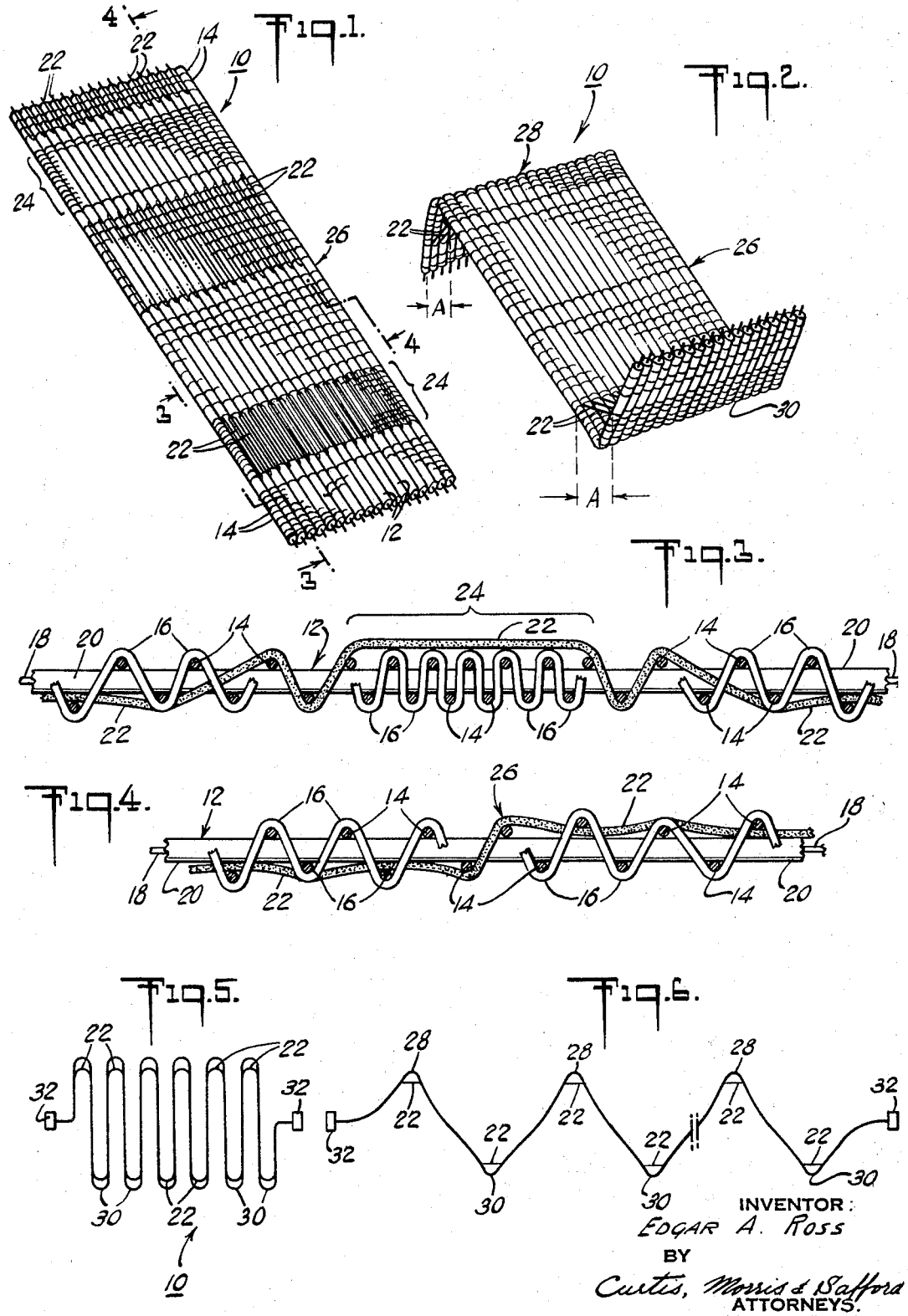

3,476,870
RESILIENT FOLDABLE WOVEN ELECTRICAL CABLE AND METHOD
Edgar A. Ross, Greenville, S.C., assignor to Southern Weaving Company, Greenville, S.C.
Filed Jan. 29, 1968, Ser. No. 701,337
Int. Cl. H01b 7/06
U.S. Cl. 174—69                                   11 Claims

ABSTRACT OF THE DISCLOSURE

A woven cable comprising wires interwoven with threads and having several longitudinally spaced zones in which selected longitudinal threads are floated free of the cable and are shorter than the other longitudinal threads in the zone. The floated threads are made of materials with a higher rate of heat shrinkage than the remaining threads of the cable and are heated to shrink them and cause the cable to fold at each of the zones. The folds alternate in direction so that the cable is foldable in the general manner of an accordion. Each fold has the property of resisting undue flexing and fatigue breakage, and is capable of restoring itself to a folded condition so as to refold the cable after it has been unfolded.

---

This invention relates to multi-conductor electrical cable. More particularly, this invention relates to flat cable formed by weaving techniques.

In many types of electrical equipment, such as computers, for example, it is desirable to mount components of the equipment in receptacles or drawers which can be moved into or out of the equipment's cabinet on slides. When testing or maintaining the electrical circuitry within the drawers, it often is desirable to maintain intact all of the electrical connections of the circuitry in the drawers to the remainder of the equipment in the cabinet while the drawer is pulled out for easy access to the circuitry. In the past, a flat molded electrical cable has been used to provide and maintain such connections. The cable is folded in the manner of an accordion bellows so that the cable folds up compactly when the drawer is pushed into the cabinet, and yet unfolds to a greater length when the drawer is pulled out so as to maintain the connection of the circuitry in the drawer to the system in the cabinet.

A major problem with cables of the foregoing type is that the wire in the cable tends to break at the folds because of fatigue caused by repeated flexing of the cables. Furthermore, the molded insulation often breaks apart and deteriorates at the folds. Thus, such prior cables do not last very long and are a serious source of equipment malfunction.

It is a major object of the present invention to provide a foldable cable which can be folded and unfolded repeatedly without serious danger of fatigue breakage or deterioration of the insulation surrounding the cable conductors. It is a further object of the present invention to provide such a cable which has built-in resiliency tending to fold it up after it has been unfolded. Other objects and advantages of the present invention will be set forth in or apparent from the following description and drawings.

In the drawings:

FIGURE 1 is a perspective view of a cable constructed in accordance with the present invention at an intermediate stage of its manufacture;

FIGURE 2 is a perspective view of the cable shown in FIGURE 1 after it has been completed;

FIGURE 3 is a cross-sectional view taken along line 3—3 of FIGURE 1;

FIGURE 4 is a cross-sectional view taken along line 4—4 of FIGURE 1;

FIGURE 5 is a schematic view of the cable shown in FIGURE 2 in a folded position;

FIGURE 6 is a schematic view of the cable shown in FIGURE 5 in an unfolded position.

The cable 10 shown in FIGURES 1 and 2 includes a plurality of insulated wires 12 interwoven together with a weft thread 14 and a plurality of warp threads 16 (see FIGURES 3 and 4), one of which is woven between each pair of adjacent wires 12. Each wire includes a conductor 18 with a coating 20 of insulating plastic or the like. Interwoven with the warp threads 16 is a second set of warp threads 22.

As is shown in FIGURE 1, and in greater detail in FIGURE 3, the cable 10 has two zones 24 in which the second warp threads 22 are "floated"; that is, they extend along one of the two surfaces of the cable without being secured to that surface. At all other places on the cable, the threads 22 are secured to one or the other of the surfaces of the cable. The zones 24 preferably are spaced equidistant from one another, and are arranged in an alternating pattern such that in one zone 24 the threads 22 are floated on one side of the cable, and in the next zone 24 the threads 22 are floated on the opposite side of the cable. At a point 26 approximately halfway between adjacent zones 24, the threads 22 pass through the cable 10 and extend along the opposite surface of the cable until the next zone 24 is reached.

In accordance with one feature of the invention, the weft threads 14 and the warp threads 16 preferably are made of an insulating "low-shrink" material; that is, a materal which has a relatively low shrinkage rate when subjected to a shrinking treatment such as heating. Suitable threads meeting these specifications are nylon and known natural fibers, with nylon being preferred. The other warp threads 22 are made of a "high-shrink" material; that is, a material having a relatively high heat shrinkage rate. Known polyolefin resins meet this specification, as do polyesters of an acid and a polyol. A particularly useful example of the polyester materials is sold under the trademark "Dacron" by the Du Pont Company.

In accordance with the method of the present invention, when the cable has been woven into the structure shown in FIGURE 1 with the threads of different shrinkage rates described above, the floated thread portions 22 in each of the zones 24 are heated so as to cause them to shrink. This causes the length of the threads in the zones 24 to be considerably less than the initial lengths of the zones 24, with the result that a bend 28 or 30 (see FIGURE 2) is formed in the cable 10 at each of the zones 24. As shown in FIGURE 2, the shrunken lengths "A" of the threads 22 in each of zones 24 is considerably less than the original length shown in FIGURE 1. The heating of the threads 22 in the zones 24 can be accomplished by any of a number of known methods, but it has been found particularly desirable to direct heated air at the threads in the zones 24 for a length of time and a temperature suitable for producing the amount of shrinkage desired. Narrow blasts of heated air are directed at only the threads in the zones 24. Therefore, the remainder of the cable is not heated. The low-shrinkage (nylon) threads 14 and 16 in the zones 24 shrink only a relatively small amount; e.g. two to ten percent, whereas the Dacron threads 22 shrink up to around 15 to 25 percent, with the result that the lengths of the threads 22 in the zones 24 are considerably less than the lengths of the conductors in those zones. The result is that the conductors are bent to form the folds 28 and 30.

As it is shown most clearly in FIGURE 3, the threads 22 in each zone 24 pass from one side of the fabric to the other at the edges of the zone. Also, the threads 22 are woven back and forth through the cable once just prior to being woven back through to the opposite side of the cable for floating. This arrangement provides locking of the ends of the floated threads so that when the cable is unfolded and pulled taut, the thread 22 at each of the corners 28 and 30 will not pull loose from the cable and will hold the shape of the folds securely.

FIGURE 5 shows the cable 10 in its folded condition, and FIGURE 6 shows it in its unfolded condition. The ends of the cables are secured to terminal blocks indicated schematically at 32 which are connected to items of electrical equipment which are movable relative to one another. When the cable is folded, the floated threads 22 are limp, as is shown in FIGURE 5. When the ends of the cable are pulled away from one another, the floated threads are pulled tight. The floated threads 22 do not allow the conductors at the folds 28 and 30 to flex very much. Instead, the cable portions between the points of attachment of the floated threads 22 flexes so that the cable has an S shape between the points of attachment. Thus, the conductors at the folds 28 and 30 flex relatively little and thus do not easily break due to fatigue. Furthermore, the flexing of the portions of the cable intermediate the folds gives the cable a resiliency which causes it to tend to refold itself after it has been unfolded.

Preferably, there is one warp thread 22 for every warp thread 16, and the wap threads 22 are spaced evenly along the widths of the cable. As is shown in FIGURES 3 and 4, binding of the threads 22 to one surface of the cable is done by weaving the threads 22 first beneath one weft strand 14 and then over the next, beneath the next, and so forth. As is shown in FIGURE 4, the thread 22 passes through the fabric at a location 26 approximately intermediate each of the adjacent zones 24 so that the threads will be floated on the proper side of the cable and cause the bends to occur in the alternating pattern described above.

The weft thread 14 preferably is a continuous thread wrapped spirally around the wires 12 in the weaving process. Preferably, the weft thread strands 14 are spaced more closely in each of the zones 24 than in other portions of the cable in order to give the cable added abrasion resistance at the corners 28 and 30. This is most beneficial in electronic installation in which the corners regularly slide along the bottom of housings or other structures.

With the foregoing weaving arrangement, the cable is easy to "strip"; that is, it is easy to separate the wires 12 from the cable, strip the insulation 20 from the conductors 18, and attach the conductors to electrical equipment. All that need be done is to pass a knife or other sharp instrument longitudinally between a pair of adjacent wires 12, thus cutting the weft thread 14, next spreading the wires apart, removing the insulation 20 from the wire ends, and then attaching the bare conductors to appropriate terminal boards or electrical equipment.

I claim:

1. A woven cable, said woven cable comprising, in combination, a plurality of elongated conductors, warp and weft threads interwoven with one another and with said conductors and binding said conductors together in insulated relationship to one another forming an elongated cable, said cable having a longitudinal segment in which the length of selected threads extending in the direction of said conductors is shorter than the length of the conductors in said cable so as to form a bend in said cable in said segment.

2. A cable as in claim 1 including a plurality of said segments, the direction of the bend in each segment being opposite to the direction of each adjacent bend forming a multiple reverse-bend foldable cable.

3. A cable as in claim 1 in which said selected threads are floated free from one side of said cable in said segment and pass through said cable to the opposite side thereof at the ends of said segment.

4. A cable as in claim 1 in which said selected threads are made of materials having a shrinkage rate substantially greater than the shrinkage rate of the materials forming the remaining threads in said cable.

5. A cable as in claim 4 in which said selected threads are made of a material selected from the group consisting of polyolefin resins and polyesters of an acid and a polyol.

6. A woven cable, said woven cable comprising, in combination, a plurality of elongated conductors, warp and weft threads interwoven with one another and with said conductors and with said warp and weft threads separating and binding said conductors together forming an elongated cable, said conductors being in substantially parallel, side-by-side relationship to one another forming a flat woven cable, said cable having selected warp threads which, at successive positions along the length of said cable, are bound to a first surface of said cable, then pass through said cable and extend along the opposite surface of said cable in unbound relationship thereto for a distance defining a first zone, then pass back through said cable and extend along said first surface in bound relationship thereto, pass back through the cable and exit along said first surface for a distance defining a second zone in unbound relationship thereto, and then back again through the cable, said selected threads in each of said zones being shorter than the length of the conductors in said zones forming bends in said cable, successive ones of said bends being in opposite directions.

7. A cable as in claim 6 in which said selected warp threads are made of a material of relatively higher heat shrinkage rate than the material of the remaining warp threads, there being approximately equal numbers of both types of warp threads, there being one of each type for each conductor in said cable.

8. A method of manufacturing woven cable, said method comprising the steps of weaving elongated conductors and warp and weft threads together to form a cable, selected ones of the threads which extend in the direction of said conductors having, in a zone of said cable, a heat shrinkage rate substantially greater than that of the remaining threads in said cable, and heating the threads in said zone of said cable to heat-shrink the portions of said selected threads located in said zone.

9. A method as in claim 8 in which said weaving step includes floating said selected threads on a surface of said cable in said zone and binding said selected threads to said cable at locations beyond said zone.

10. A method as in claim 8 in which said selected threads are made of a material selected from the group consisting of polyolefin resins and polyesters of an acid and a polyol.

11. A method as in claim 10 in which said heataing step comprises flowing a hot gas over the threads in said zone for a length of time sufficient to obtain the amount of shrinkage desired.

References Cited
UNITED STATES PATENTS

| | | | |
|---|---|---|---|
| 2,902,535 | 9/1959 | Francis | 174—69 |
| 3,371,250 | 2/1968 | Ross et al. | |

DARREL L. CLAY, Primary Examiner

U.S. Cl. X.R.

57—140; 174—117